US011569700B2

(12) United States Patent
Hino et al.

(10) Patent No.: US 11,569,700 B2
(45) Date of Patent: Jan. 31, 2023

(54) ROTATING ELECTRIC MACHINE

(71) Applicant: Mitsubishi Electric Corporation, Tokyo (JP)

(72) Inventors: Tatsuro Hino, Tokyo (JP); Kohei Egashira, Tokyo (JP); Shinya Matsunaga, Tokyo (JP); Yasuhiro Hayasaka, Tokyo (JP); Norihiro Murata, Tokyo (JP); Kazuya Hasegawa, Tokyo (JP); Katsuya Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 161 days.

(21) Appl. No.: 17/082,541

(22) Filed: Oct. 28, 2020

(65) Prior Publication Data

US 2021/0184526 A1   Jun. 17, 2021

(30) Foreign Application Priority Data

Dec. 13, 2019 (JP) .............................. JP2019-225245

(51) Int. Cl.
*H02K 3/00* (2006.01)
*H02K 3/28* (2006.01)
*H02K 3/12* (2006.01)

(52) U.S. Cl.
CPC ................ *H02K 3/28* (2013.01); *H02K 3/12* (2013.01)

(58) Field of Classification Search
CPC   H02K 3/487; H02K 3/12; H02K 3/28; H02K 3/24; H02K 3/18; H02K 3/50; H02K 1/02; H02K 1/165; H02K 1/12; H02K 5/1285; H02K 15/12; Y10T 29/49009; Y10T 29/49012

See application file for complete search history.

(56) References Cited

U.S. PATENT DOCUMENTS 6,717,317 B2 * 4/2004 Akita ................. H02K 15/0081
                                                        310/201
8,183,734 B2 * 5/2012 Saban ..................... H02K 1/165
                                                        310/179

(Continued)

FOREIGN PATENT DOCUMENTS

JP       2014-036560 A    2/2014
JP       5586969 B2       9/2014

*Primary Examiner* — Phutthiwat Wongwian
*Assistant Examiner* — Sherman D Manley
(74) *Attorney, Agent, or Firm* — Sughrue Mion, PLLC; Richard C. Turner

(57) ABSTRACT

To obtain a rotating electric machine capable of downsizing the rotating electric machine in an axial direction and in a radial direction. A first inner-peripheral-side terminal includes a first conductor-exposed portion and a second inner-peripheral-side terminal includes a second conductor-exposed portion opposed to the first conductor-exposed portion. An opposing portion being a portion, at which the first conductor-exposed portion and the second conductor-exposed portion are opposed to each other, extends in a radial direction, and at least a part of the opposing portion of the first conductor-exposed portion and the second conductor-exposed portion is arranged on an inner side in the radial direction compared to the first outer-peripheral-side terminal and the second outer-peripheral-side terminal.

10 Claims, 17 Drawing Sheets

(56) References Cited

U.S. PATENT DOCUMENTS

| | | | |
|---|---|---|---|
| 9,136,738 B2* | 9/2015 | Ikeda | H02K 3/28 |
| 10,461,591 B2* | 10/2019 | Sakaue | H02K 15/085 |
| 2002/0017825 A1* | 2/2002 | Oohashi | H02K 3/28 |
| | | | 310/207 |
| 2002/0047450 A1* | 4/2002 | Asao | H02K 3/12 |
| | | | 310/184 |
| 2003/0011268 A1* | 1/2003 | Even | H02K 9/06 |
| | | | 310/179 |
| 2006/0033394 A1* | 2/2006 | Ogawa | H02K 3/12 |
| | | | 310/179 |
| 2010/0019610 A1* | 1/2010 | Saban | H02K 1/02 |
| | | | 310/198 |
| 2011/0175472 A1 | 7/2011 | Koike et al. | |
| 2013/0076188 A1* | 3/2013 | Ikeda | H02K 3/28 |
| | | | 310/195 |
| 2018/0034351 A1* | 2/2018 | Ramet | H02K 3/28 |
| 2020/0251968 A1* | 8/2020 | Hino | H02K 15/062 |
| 2020/0259401 A1* | 8/2020 | Baba | H02K 11/25 |
| 2020/0287447 A1* | 9/2020 | Ciftcioglu | H02K 3/50 |
| 2021/0175764 A1* | 6/2021 | Ramet | H02K 15/0414 |
| 2021/0184525 A1* | 6/2021 | Hino | H02K 3/28 |
| 2021/0184532 A1* | 6/2021 | Egashira | H02K 9/19 |

* cited by examiner

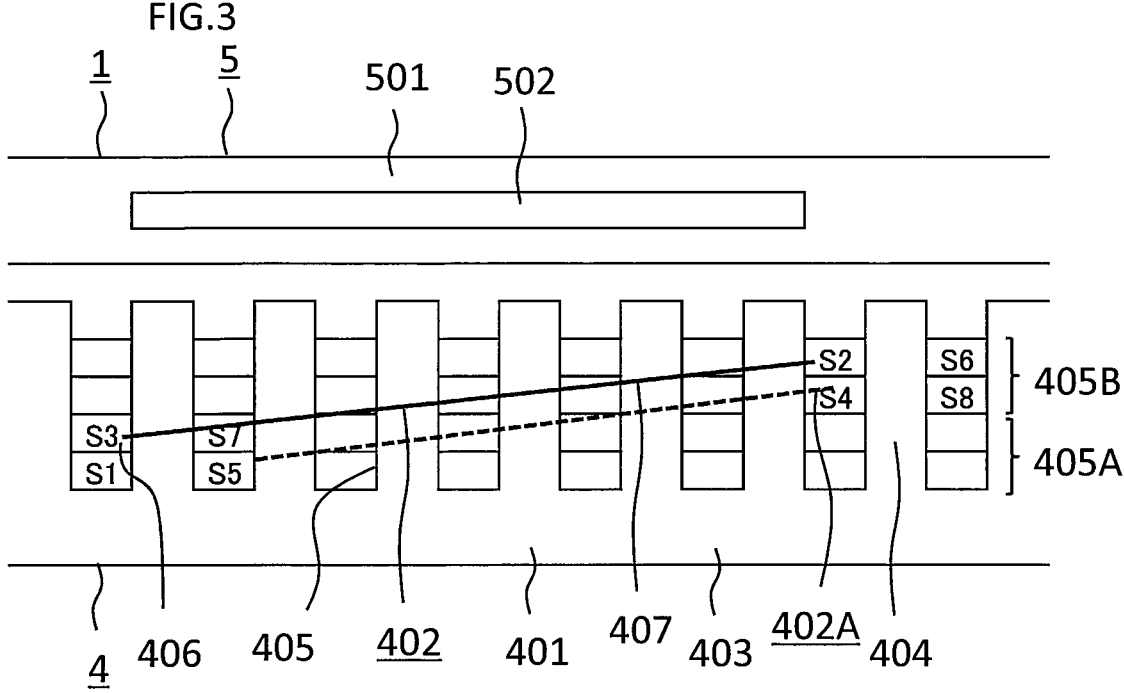
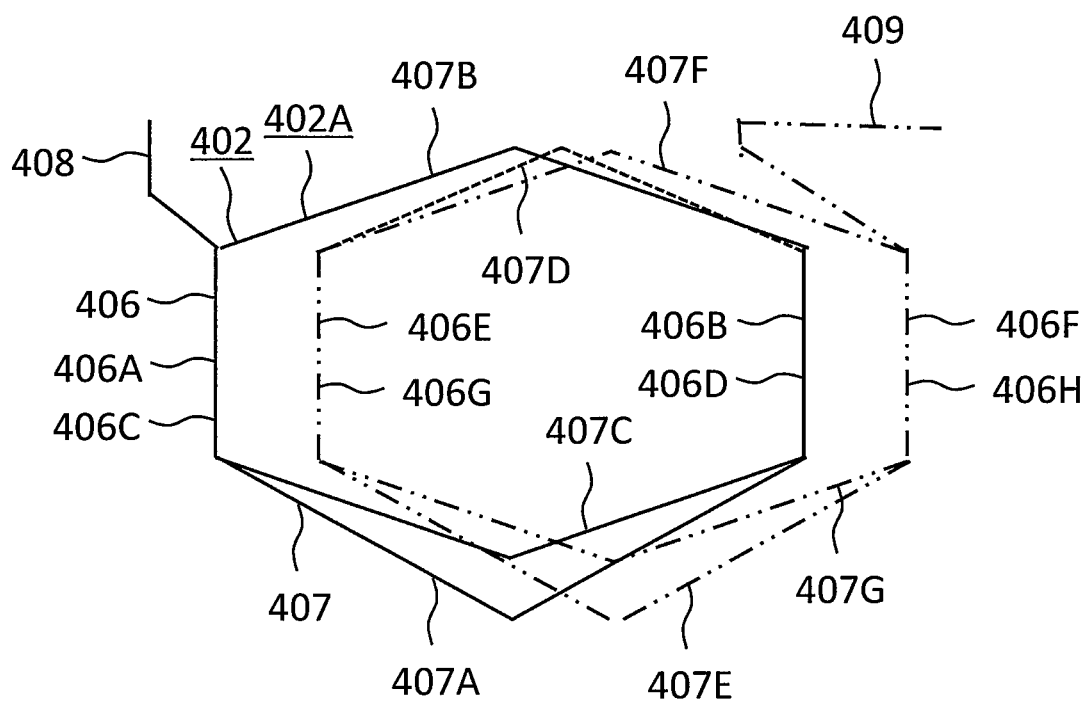

ROTATING ELECTRIC MACHINE

BACKGROUND OF THE INVENTION

1. Field of the Invention

The present disclosure relates to a rotating electric machine including a plurality of coils.

2. Description of the Related Art

There has hitherto been known a rotating electric machine including a stator core, which has a plurality of slots arranged in a circumferential direction, and a plurality of coils of distributed winding, which are provided to the stator core. The plurality of coils include first coils and second coils, which are adjacent to each other in the circumferential direction and are electrically connected to each other. The first coils each include a first outer-peripheral-side terminal projecting in an axial direction from an outside region of the slot in a radial direction. The second coil includes a second inner-peripheral-side terminal projecting in the axial direction from an inside region of the slot in the radial direction. The first outer-peripheral-side terminal and the second inner-peripheral-side terminal project in the axial direction from the same slot. The first outer-peripheral-side terminal and the second inner-peripheral-side terminal include respective conductor-exposed portions which are opposed to each other. The conductor-exposed portion of the first outer-peripheral-side terminal and the conductor-exposed portion of the second inner-peripheral-side terminal are joined to each other. An opposing portion being a portion at which the conductor-exposed portion of the first outer-peripheral-side terminal and the conductor-exposed portion of the second inner-peripheral-side terminal are opposed to each other extends in the radial direction. With this, the rotating electric machine can be downsized in the axial direction (for example, see Japanese Patent No. 5586969).

SUMMARY OF THE INVENTION

However, the entirety of the opposing portion of the first outer-peripheral-side terminal and the second inner-peripheral-side terminal is arranged on an outer side in the radial direction compared to a portion of the first outer-peripheral-side terminal excluding the conductor-exposed portion. Therefore, there is a problem in that the rotating electric machine is increased in size in the radial direction.

The present disclosure has been made to solve the problem mentioned above, and has an object to provide a rotating electric machine which is capable of downsizing a rotating electric machine in an axial direction and in a radial direction.

According to at least one embodiment of the present disclosure, there is provided a rotating electric machine, including: an armature core having a plurality of slots arranged in a circumferential direction; and a plurality of coils of distributed winding provided to the armature core, wherein the plurality of the coils include: a plurality of first coils each including: a first outer-peripheral-side terminal projecting in an axial direction from an outside region of the slot in a radial direction; and a first inner-peripheral-side terminal projecting in the axial direction from an inside region of the slot in the radial direction spaced apart on one side in the circumferential direction with respect to the slot from which the first outer-peripheral-side terminal projects; and a plurality of second coils each including: a second outer-peripheral-side terminal projecting in the axial direction from an outside region of the slot in the radial direction; and a second inner-peripheral-side terminal projecting in the axial direction from an inside region of the slot in the radial direction spaced apart on one side in the circumferential direction with respect to the slot from which the second outer-peripheral-side terminal projects, wherein the plurality of first coils and the plurality of second coils are alternately arranged in the circumferential direction so that the first outer-peripheral-side terminal and the second inner-peripheral-side terminal project from the same slot, and that the first inner-peripheral-side terminal and the second outer-peripheral-side terminal project from the same slot, wherein the first inner-peripheral-side terminal includes a first conductor-exposed portion, wherein the second inner-peripheral-side terminal includes a second conductor-exposed portion opposed to the first conductor-exposed portion, wherein an opposing portion being a portion, at which the first conductor-exposed portion and the second conductor-exposed portion are opposed to each other, extends in the radial direction, and wherein at least a part of the opposing portion is arranged on an inner side in the radial direction compared to the first outer-peripheral-side terminal and the second outer-peripheral-side terminal.

According to the rotating electric machine of the present disclosure, downsizing a rotating electric machine in the axial direction and in the radial direction is possible.

BRIEF DESCRIPTION OF THE DRAWINGS

FIG. 3 is a plan view for illustrating a main part of the rotating electric machine of FIG. 1.

FIG. 4 is a schematic view for illustrating a coil of FIG. 3.

DESCRIPTION OF THE EMBODIMENTS

First Embodiment

Figure 1:
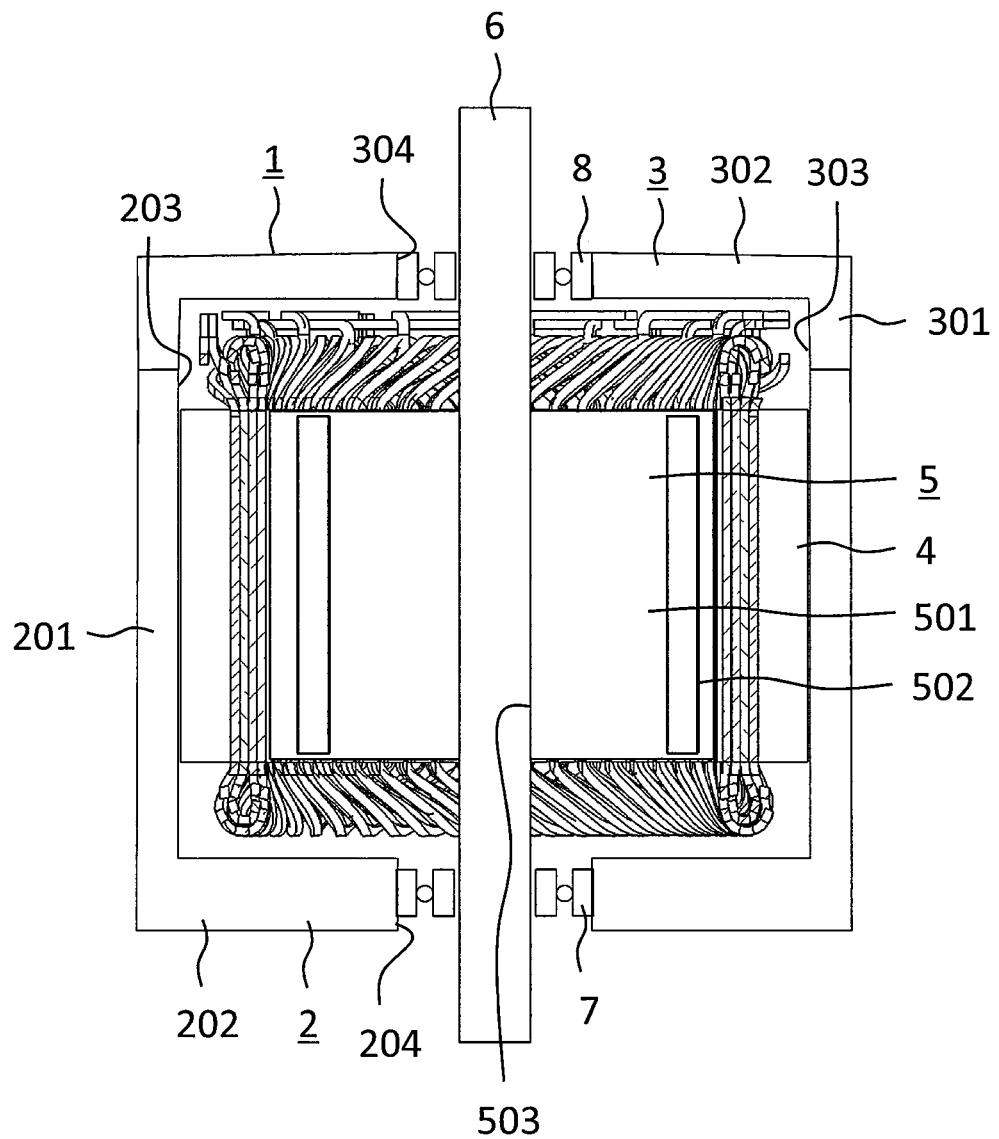
FIG. 1 is a sectional view for illustrating a rotating electric machine according to a first embodiment of the present disclosure.

FIG. 1 is a sectional view for illustrating a rotating electric machine according to a first embodiment of the present disclosure. A rotating electric machine 1 includes a housing 2 and a bracket 3 provided to the housing 2. The housing 2 includes a cylindrical portion 201 and a bottom plate portion 202 provided on one side of the cylindrical portion 201 in an axial direction. An opening portion 203 is formed at a portion of the cylindrical portion 201 on another side in the axial direction. A through hole 204 extending in a plate-thickness direction is formed at a center of the bottom plate portion 202.

The bracket 3 is provided to the housing 2 so as to close the opening portion 203 of the housing 2. The bracket 3 includes a cylindrical portion 301 and a bottom plate portion 302 provided on one side of the cylindrical portion 301 in the axial direction. An opening 303 is formed at a portion of the cylindrical portion 301 on another side in the axial direction. The opening portion 303 is continuous with the opening portion 203. A through hole 304 extending in a plate-thickness direction is formed at a center of the bottom plate portion 302.

Moreover, the rotating electric machine 1 includes a stator 4 and a rotor 5. The stator 4 is an armature provided on an inner side of the housing 2. The rotor 5 is provided on an inner side of the stator 4. Moreover, the rotating electric machine 1 includes a rotary shaft 6, a first bearing 7, and a second bearing 8. The rotary shaft 6 is provided to the rotor 5 and is configured to rotate together with the rotor 5. The first bearing 7 is provided between the housing 2 and the rotary shaft 6. The second bearing 8 is provided between the bracket 3 and the rotary shaft 6.

The stator 4 is fixed to an inner peripheral surface of the cylindrical portion 201 of the housing 2. Examples of a method of fixing the stator 4 to the cylindrical portion 201 of the housing 2 include shrink fitting and press fitting.

The rotary shaft 6 is rotatably supported on the housing 2 and the bracket 3 through intermediation of the first bearing 7 and the second bearing 8. The first bearing 7 is arranged on an inner side of the through hole 204. The second bearing 8 is arranged on an inner side of the through hole 304. Rotation of the rotary shaft 6 causes the rotor 5 to rotate.

The rotor 5 includes a rotor core 501 and a plurality of permanent magnets 502 provided to the rotor core 501. The rotor core 501 is formed into a circular column shape. A through hole 503 passing through a center of the rotor core 501 and extending in the axial direction is formed in the rotor core 501. The rotary shaft 6 is inserted into the through hole 503. The plurality of permanent magnets 502 are provided inside the rotor core 501. The plurality of permanent magnets 502 are arranged at equal intervals in a circumferential direction. The rotating electric machine 1 is a permanent magnet rotating electric machine.

In this example, the axial direction is a direction in which the rotary shaft 6 extends. A radial direction is a radial direction given when an axis of the rotary shaft 6 is a center line. The circumferential direction is a circumferential direction given when the axis of the rotary shaft 6 is the center line.

Figure 2:
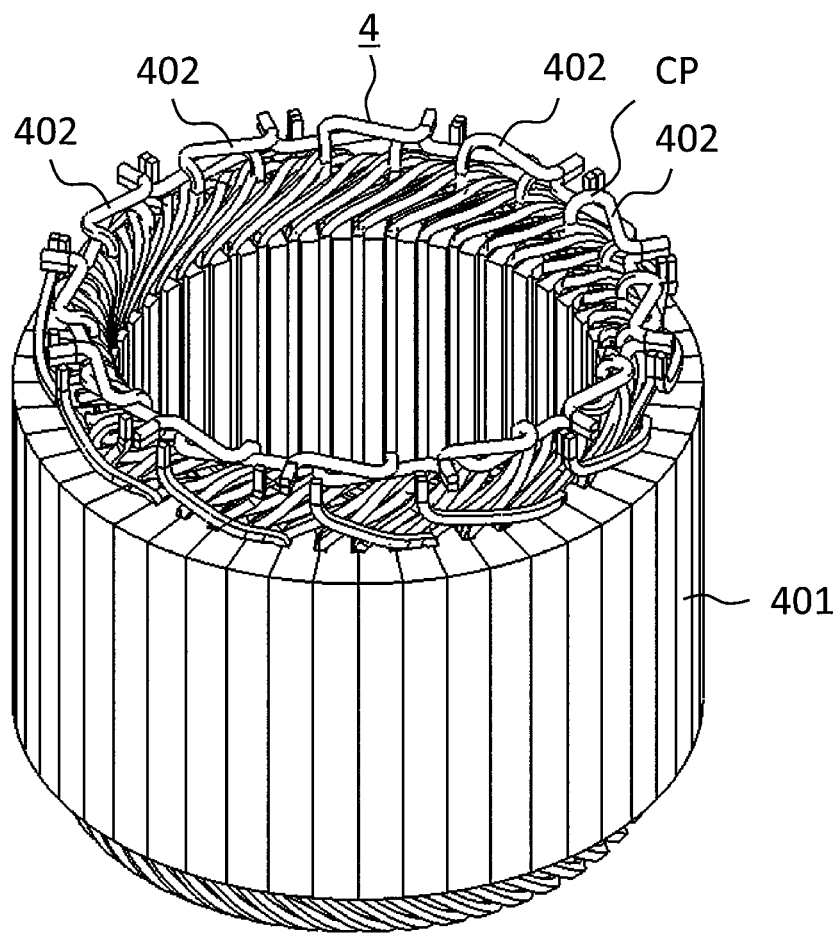
FIG. 2 is a perspective view for illustrating a stator of FIG. 1.

FIG. 2 is a perspective view for illustrating the stator 4 of FIG. 1. The stator 4 includes a stator core 401 being an armature core and a plurality of coils 402 of distributed winding provided to the stator core 401.

The rotor 5 has eight poles, and the stator 4 has forty-eight slots. The plurality of coils 402 are separated into three phases. The plurality of slots are formed in the stator core 401 with a ratio of two slots per pole and per phase.

FIG. 3 is a plan view for illustrating a main part of the rotating electric machine 1 of FIG. 1. FIG. 4 is a schematic view for illustrating the coil 402 of FIG. 3. In FIG. 3, a right-and-left direction corresponds to the circumferential direction, and an up-and-down direction corresponds to the radial direction. The stator core 401 includes a core back 403 having a cylindrical shape and a plurality of teeth 404 provided to the core back 403. The plurality of teeth 404 extend from the core back 403 toward an inner side in the radial direction. The plurality of teeth 404 are arranged in the circumferential direction. A slot 405 is formed between teeth 404 adjacent to each other in the circumferential direction. A plurality of slots 405 are arranged in the circumferential direction. The coils 402 are inserted into the plurality of slots 405.

A region of the slot 405 on an outer side in the radial direction is referred to as "slot radially outer region 405A." A region of the slot 405 on an inner side in the radial direction is referred to as "slot radially inner region 405B."

The plurality of coils 402 include a plurality of in-phase coils 402A. The plurality of in-phase coils 402A are in phase with each other, are arranged in the circumferential direction, and are electrically connected to each other. In FIG. 3 and FIG. 4, one in-phase coil 402A is illustrated.

The coil 402 includes slot portions 406 and turn portions 407. The slot portions 406 are inserted into the slots 405. The turn portions 407 each connect a pair of slot portions 406 inserted into different slots 405. Moreover, the coil 402 includes an outer-peripheral-side terminal 408 and an inner-peripheral-side terminal 409. The outer-peripheral-side terminal 408 projects from the slot radially outer region 405A toward one side in the axial direction. The inner-peripheral-side terminal 409 projects from the slot radially inner region 405B toward one side in the axial direction.

In FIG. 3, regions of the plurality of slots 405 into which the plurality of slot portions 406 included in the in-phase coils 402A are inserted are indicated by S1, S2, S3, S4, S5, S6, S7, and S8. The slot portion 406 inserted into the region S1 is referred to as "slot portion 406A." The slot portion 406 inserted into the region S2 is referred to as "slot portion 406B." The slot portion 406 inserted into the region S3 is referred to as "slot portion 406C." The slot portion 406 inserted into the region S4 is referred to as "slot portion 406D." The slot portion 406 inserted into the region S5 is referred to as "slot portion 406E." The slot portion 406 inserted into the region S6 is referred to as "slot portion 406F." The slot portion 406 inserted into the region S7 is referred to as "slot portion 406G." The slot portion 406 inserted into the region S8 is referred to as "slot portion 406H."

The turn portion 407 connecting the slot portion 406A and the slot portion 406B to each other is referred to as "turn portion 407A." The turn portion 407 connecting the slot portion 406B and the slot portion 406C to each other is referred to as "turn portion 407B." The turn portion 407 connecting the slot portion 406C and the slot portion 406D to each other is referred to as "turn portion 407C." The turn portion 407 connecting the slot portion 406D and the slot portion 406E to each other is referred to as "turn portion 407D." The turn portion 407 connecting the slot portion 406E and the slot portion 406F to each other is referred to as "turn portion 407E." The turn portion 407 connecting the slot portion 406F and the slot portion 406G to each other is referred to as "turn portion 407F." The turn portion 407 connecting the slot portion 406G and the slot portion 406H to each other is referred to as "turn portion 407G."

The outer-peripheral-side terminal 408 and the inner-peripheral-side terminal 409 are connected to another in-phase coil 402A or an inverter device. The inverter device is configured to supply a current to the coils 402.

For example, when a current is supplied from an outside to the outer-peripheral-side terminal 408, the current flows through the inner-peripheral-side terminal 409 via the slot portions 406 and the turn portions 407, and then is supplied to another in-phase coil 402A. Through the supply of the current to the coils 402, a magnetic field is generated in the stator.

The pair of slot portions 406 indicated by the region S1 and the region S2 are inserted into the pair of slots 405 spaced apart in the circumferential direction by the amount corresponding to six slots 405, and are connected to each other by the turn portion 407. Similarly, the pair of slot portions 406 indicated by the region S2 and the region S3 and the pair of slot portions 406 indicated by the region S3 and the region S4 are inserted into the pair of slots 405 spaced apart in the circumferential direction by the amount corresponding to six slots 405, and are connected to each other by the turn portion 407.

Meanwhile, the pair of slot portions 406 indicated by the region S4 and the region S5 are inserted into the pair of slots 405 spaced apart in the circumferential direction by the amount corresponding to five slots 405, and are connected to each other by the turn portion 407.

The pair of slot portions 406 indicated by the region S5 and the region S6 are inserted into the pair of slots 405 spaced apart in the circumferential direction by the amount corresponding to six slots 405, and are connected to each other by the turn portion 407. Similarly, the pair of slot portions 406 indicated by the region S6 and the region S7 and the pair of slot portions 406 indicated by the region S7 and the region S8 are inserted into the pair of slots 405 spaced apart in the circumferential direction by the amount corresponding to six slots 405, and are connected to each other by the turn portion 407.

Figure 5:
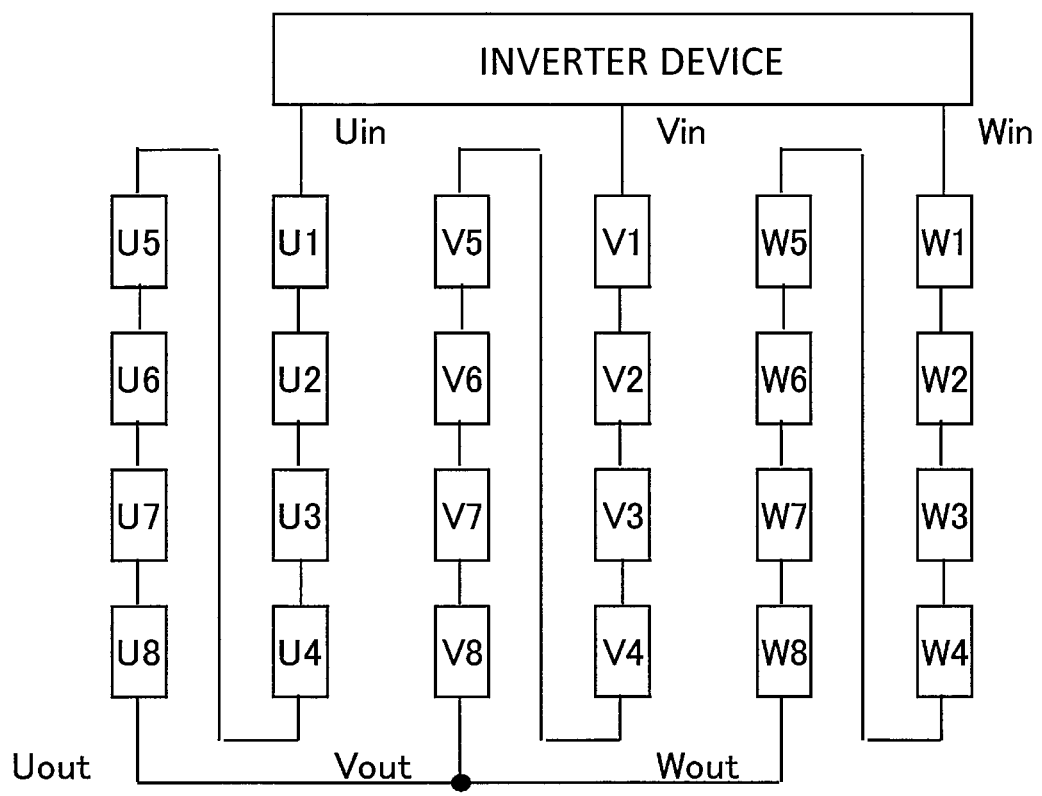
FIG. 5 is a connection diagram for illustrating coils of FIG. 1.

FIG. 5 is a connection diagram for illustrating the coils 402 of FIG. 1. In FIG. 5, U-phase coils 402 among the plurality of coils 402 are indicated by U1, U2, U3, U4, U5, U6, U7, and U8. Further, in FIG. 5, V-phase coils 402 among the plurality of coils 402 are indicated by V1, V2, V3, V4, V5, V6, V7, and V8. Further, in FIG. 5, W-phase coils 402 among the plurality of coils 402 are indicated by W1, W2, W3, W4, W5, W6, W7, and W8.

The outer-peripheral-side terminals 408 or the inner-peripheral-side terminals 409 of the coils 402 indicated by U1, V1, and W1 are connected to the inverter device. The outer-peripheral-side terminals 408 or the inner-peripheral-side terminals 409 of the coils 402 indicated by U8, V8, and W8 are connected to each other.

Figure 6:
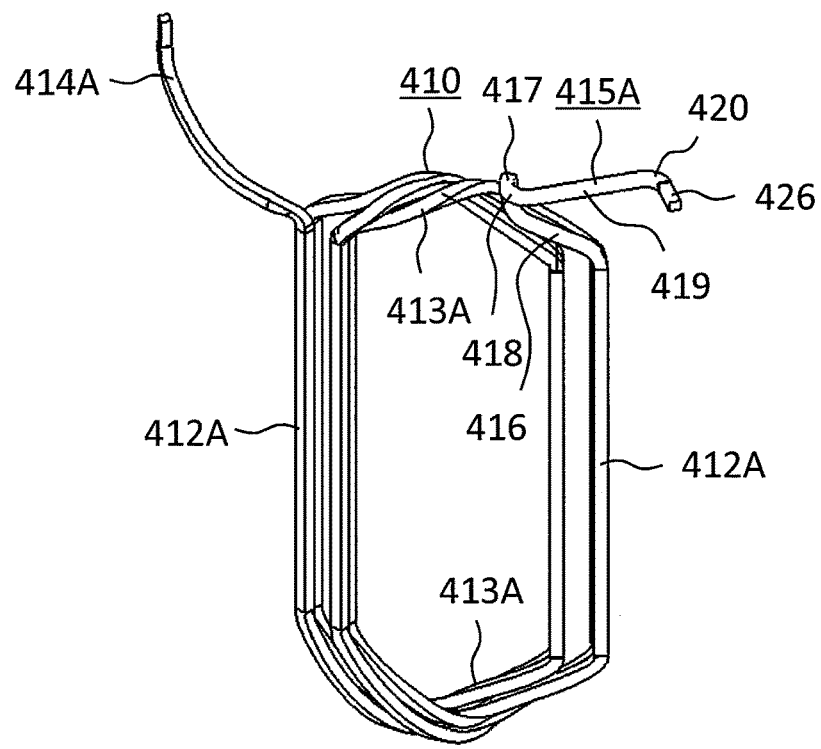
FIG. 6 is a perspective view for illustrating a first coil.
Figure 7:
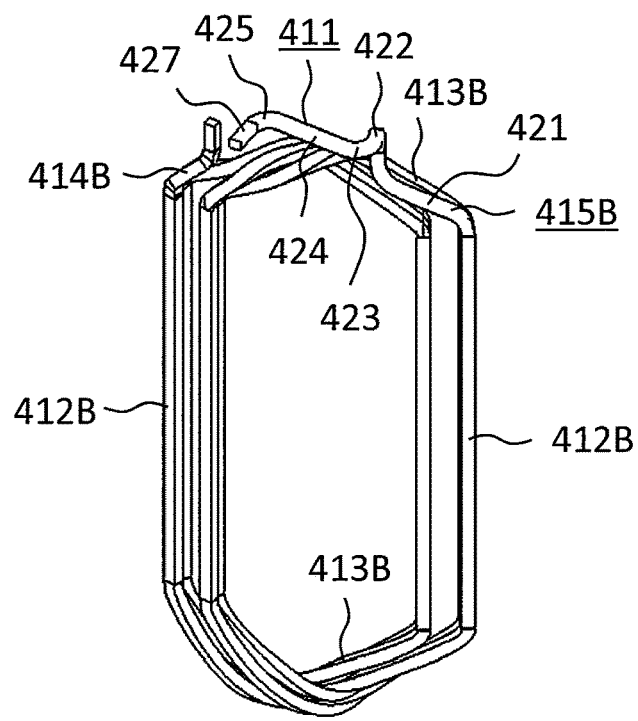
FIG. 7 is a perspective view for illustrating a second coil.
Figure 8:
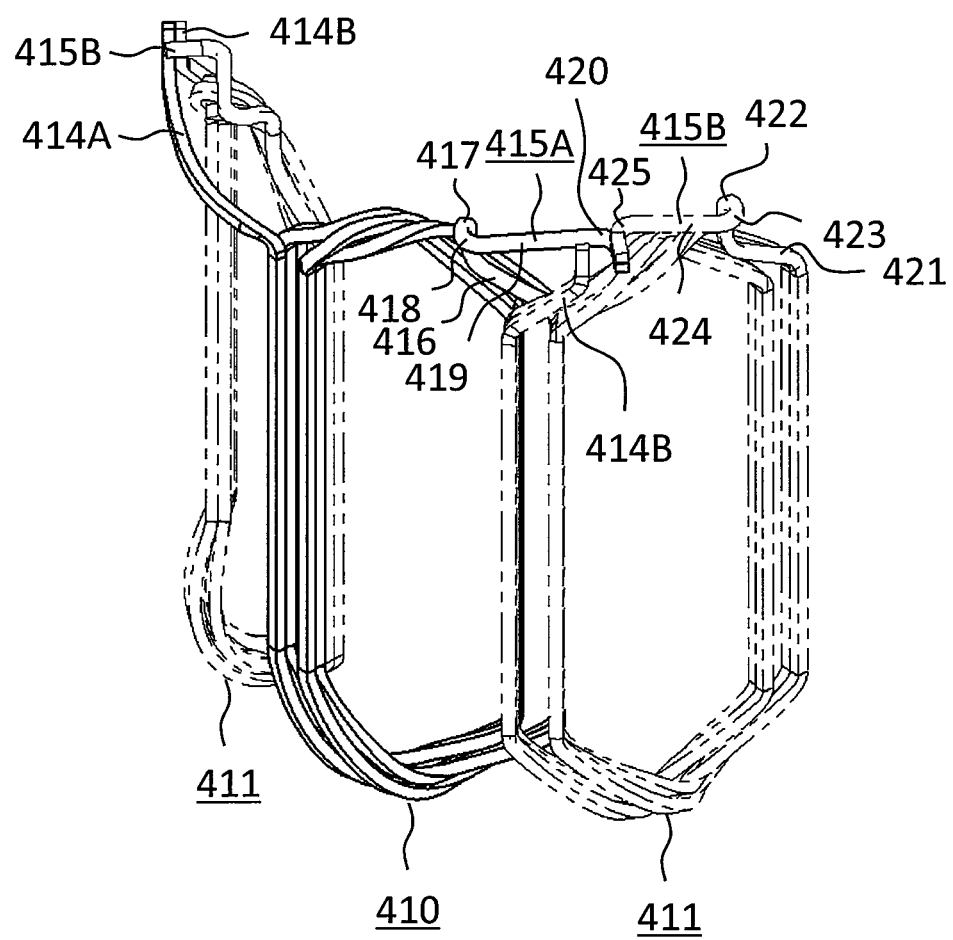
FIG. 8 is a perspective view for illustrating the first coil and the second coil.

FIG. 6 is a perspective view for illustrating a first coil. FIG. 7 is a perspective view for illustrating a second coil. FIG. 8 is a perspective view for illustrating the first coil and the second coil. The plurality of coils 402 include a plurality of first coils 410 and a plurality of second coils 411. The first coils 410 and the second coils 411 are alternately arranged in the circumferential direction.

In the first coil 410, the slot portions 406 are each referred to as "first slot portion 412A," and the turn portions 407 are each referred to as "first turn portion 413A." Further, the outer-peripheral-side terminal 408 is referred to as "first outer-peripheral-side terminal 414A," and the inner-peripheral-side terminal 409 is referred to as "first inner-peripheral-side terminal 415A." The first outer-peripheral-side terminal 414A projects toward one side in the axial direction from the slot radially outer region 405A in the slot 405. The first inner-peripheral-side terminal 415A projects toward one side in the axial direction from the slot radially inner region 405B of the slot 405 located apart on one side in the circumferential direction with respect to the slot 405 from which the first outer-peripheral-side terminal 414A projects.

In the second coil 411, the slot portions 406 are each referred to as "second slot portion 412B," and the turn portions 407 are each referred to as "second turn portion 413B." Further, the outer-peripheral-side terminal 408 is referred to as "second outer-peripheral-side terminal 414B," and the inner-peripheral-side terminal 409 is referred to as "second inner-peripheral-side terminal 415B." The second outer-peripheral-side terminal 414B projects toward one side in the axial direction from the slot radially outer region 405A in the slot 405. The second inner-peripheral-side terminal 415B projects toward one side in the axial direction from the slot radially inner region 405B of the slot 405 located apart on one side in the circumferential direction with respect to the slot 405 from which the second outer-peripheral-side terminal 414B projects.

Between the first coil 410 and the second coil 411 adjacent to the first coil 410 on one side in the circumferential direction, the first inner-peripheral-side terminal 415A and the second outer-peripheral-side terminal 414B alternately project from the same slot 405. Meanwhile, between the first coil 410 and the second coil 411 adjacent to the first coil 410 on another side in the circumferential direction, the first outer-peripheral-side terminal 414A and the second inner-peripheral-side terminal 415B alternately project from the same slot 405.

Between the first coil 410 and the second coil 411 adjacent to the first coil 410 on one side in the circumferential direction, the first inner-peripheral-side terminal 415A and the second inner-peripheral-side terminal 415B are joined to each other. Meanwhile, between the first coil 410 and the second coil 411 adjacent to the first coil 410 on another side in the circumferential direction, the first outer-peripheral-side terminal 414A and the second outer-peripheral-side terminal 414B are joined to each other.

The first inner-peripheral-side terminal 415A includes a first base portion 416, a first radially bent portion 417, a first inner bent portion 418, a first oblique portion 419, and a first outer bent portion 420.

The first base portion 416 projects from the slot 405 toward one side in the axial direction. The first radially bent portion 417 is connected to a distal end portion of the first base portion 416. The first radially bent portion 417 is bent along a perpendicular plane with respect to the circumferential direction so that a distal end portion thereof is directed toward an outer side in the radial direction.

The first inner bent portion 418 is connected to a distal end portion of the first radially bent portion 417. The first inner bent portion 418 is bent along a perpendicular plane with respect to the axial direction so that a distal end portion thereof is arranged on an inner side in the radial direction compared to an intermediate portion.

The first oblique portion 419 is connected to a distal end portion of the first inner bent portion 418. The first oblique portion 419 is arranged along a perpendicular plane with respect to the axial direction so that a distal end portion thereof is arranged on an inner side in the radial direction compared to a base end portion thereof.

The first outer bent portion 420 is connected to a distal end portion of the first oblique portion 419. The first outer bent portion 420 is bent along a perpendicular plane with respect to the axial direction so that a distal end portion thereof is directed toward an outer side in the radial direction.

The second inner-peripheral-side terminal 415B includes a second base portion 421, a second radially bent portion 422, a second inner bent portion 423, a second oblique portion 424, and a second outer bent portion 425.

The second base portion 421 projects from the slot 405 toward one side in the axial direction. The second radially bent portion 422 is connected to a distal end portion of the second base portion 421. The second radially bent portion 422 is bent along a perpendicular plane with respect to the circumferential direction so that a distal end portion thereof is directed toward an outer side in the radial direction.

The second inner bent portion 423 is connected to a distal end portion of the second radially bent portion 422. The second inner bent portion 423 is bent along a perpendicular plane with respect to the axial direction so that a distal end portion thereof is arranged on an inner side in the radial direction compared to an intermediate portion.

The second oblique portion 424 is connected to a distal end portion of the second inner bent portion 423. The second oblique portion 424 is arranged along a perpendicular plane with respect to the axial direction so that a distal end portion thereof is arranged on an inner side in the radial direction compared to a base end portion thereof.

The second outer bent portion 425 is connected to a distal end portion of the second oblique portion 424. The second outer bent portion 425 is bent along a perpendicular plane with respect to the axial direction so that a distal end portion thereof is directed toward an outer side in the radial direction.

The first inner-peripheral-side terminal 415A includes a first conductor-exposed portion 426. The first conductor-exposed portion 426 is arranged at a distal end portion of the first inner-peripheral-side terminal 415A. The first inner-peripheral-side terminal 415A extends in the radial direction.

The second inner-peripheral-side terminal 415B includes a second conductor-exposed portion 427. The second conductor-exposed portion 427 is arranged at a distal end portion of the second inner-peripheral-side terminal 415B. The second inner-peripheral-side terminal 415B extends in the radial direction.

The second inner-peripheral-side terminal 415B is opposed to the first inner-peripheral-side terminal 415A in the axial direction. The first conductor-exposed portion 426 and the second conductor-exposed portion 427 are placed on each other. The first conductor-exposed portion 426 and the second conductor-exposed portion 427 are joined to each other by, for example, welding or soldering.

A position of the first radially bent portion 417 in the axial direction and a position of the second radially bent portion 422 in the axial direction are different from each other. In this example, the second radially bent portion 422 is arranged more apart from the stator core 401 than the first radially bent portion 417 in the axial direction. A difference between the position of the first radially bent portion 417 in the axial direction and the position of the second radially bent portion 422 in the axial direction matches with a dimension of a diameter of a lead wire forming the coil 402. With this, the first conductor-exposed portion 426 and the second conductor-exposed portion 427 can easily be placed on each other in the axial direction. In each of the plurality of first coils 410 and the plurality of second coils 411, the position of the first radially bent portion 417 in the axial direction and the position of the second radially bent portion 422 in the axial direction are different from each other.

Figure 9:
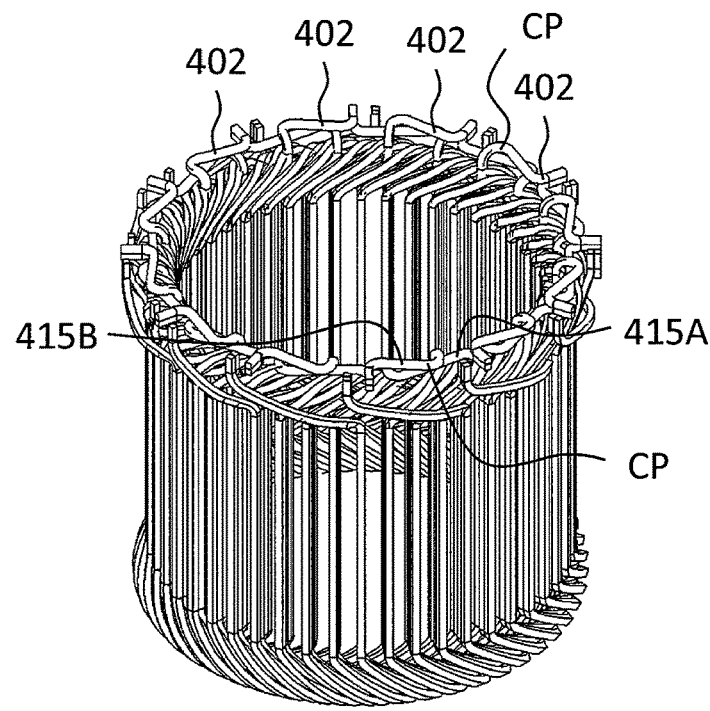
FIG. 9 is a perspective view for illustrating a plurality of coils of FIG. 2.

FIG. 9 is a perspective view for illustrating the plurality of coils 402 of FIG. 2. A cross point is a portion at which terminals of coils 402 projecting from different slots overlap each other in the axial direction or in the radial direction. Twenty-four coils 402 are arranged in the circumferential direction. A portion at which the first inner-peripheral-side terminal 415A of one coil 402 of a pair of coils 402 having different phases and the second inner-peripheral-side terminal 415B of another coil 402 overlap each other as seen in the axial direction is referred to as "cross point CP." The cross point CP is arranged on an outer side in the radial direction compared to the first radially bent portion 417 and the second radially bent portion 422.

Figure 10:
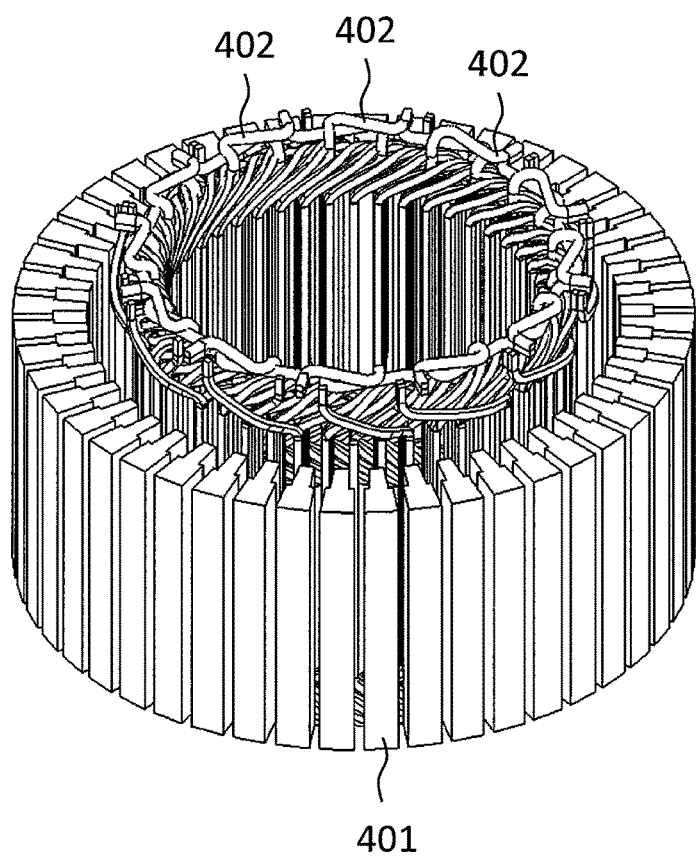
FIG. 10 is a perspective view for illustrating a state in which a stator core is to be mounted to the plurality of coils of FIG. 9.

FIG. 10 is a perspective view for illustrating a state in which the stator core 401 is to be mounted to the plurality of coils 402 of FIG. 9. The stator core 401 is divided into a plurality of stator core segments. The plurality of stator core segments are to be inserted into the coils 402. In this example, the stator core 401 to be mounted to the coils 402 by inserting the stator core segments into the coils 402 from the outer side toward the inner side in the radial direction. It is not always required that the stator core 401 be divided into a plurality of stator core segments. In this case, the coils 402 are mounted to the stator core 401 by inserting the coils 402 into the slots 405 of the stator core 401 from the inner side toward the outer side in the radial direction.

Figure 11:
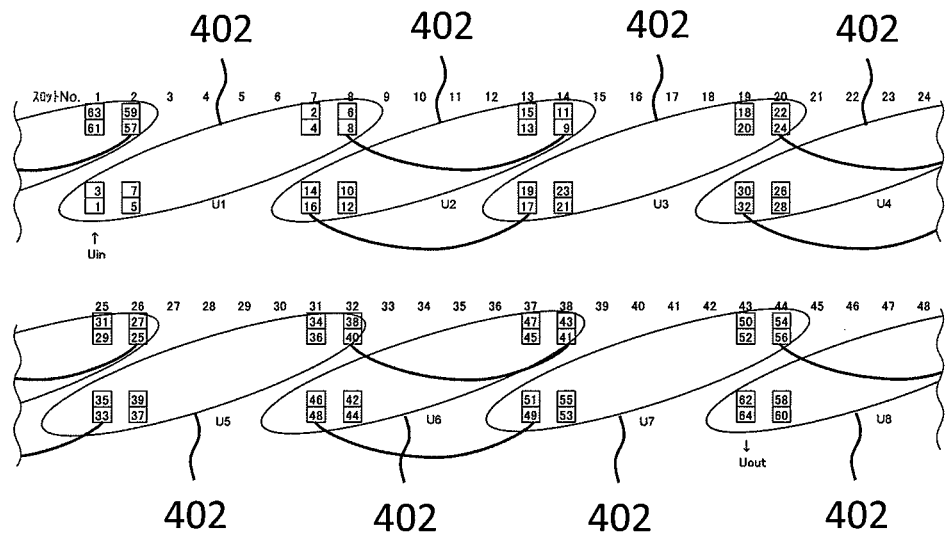
FIG. 11 is a view for illustrating a connection pattern of the plurality of coils.

FIG. 11 is a view for illustrating a connection pattern of the plurality of coils 402. In FIG. 11, $U_{in}$ represents a power supplying portion configured to supply a current to the U-phase coils 402, and $U_{out}$ represents a neutral point. In FIG. 11, the slot numbers represent the forty-eight slots 405, respectively. Four slot portions 406 are inserted into each of the slots 405 of FIG. 11. The four slot portions 406 inserted into one slot 405 are arranged in the radial direction. In FIG. 11, the order of insertion into the slots 405 is shown at the plurality of slot portions 406.

As illustrated in FIG. 8, the first inner-peripheral-side terminal 415A of the first coil 410 and the second inner-peripheral-side terminal 415B of the second coil 411 are joined to each other. Moreover, the first outer-peripheralside terminal 414A of the first coil 410 and the second outer-peripheral-side terminal 414B of the second coil 411 are joined to each other.

As illustrated in FIG. 3, one coil 402 is arranged over two slots 405 arranged in the circumferential direction. With this, the number of coils 402 can be reduced.

Figure 12:
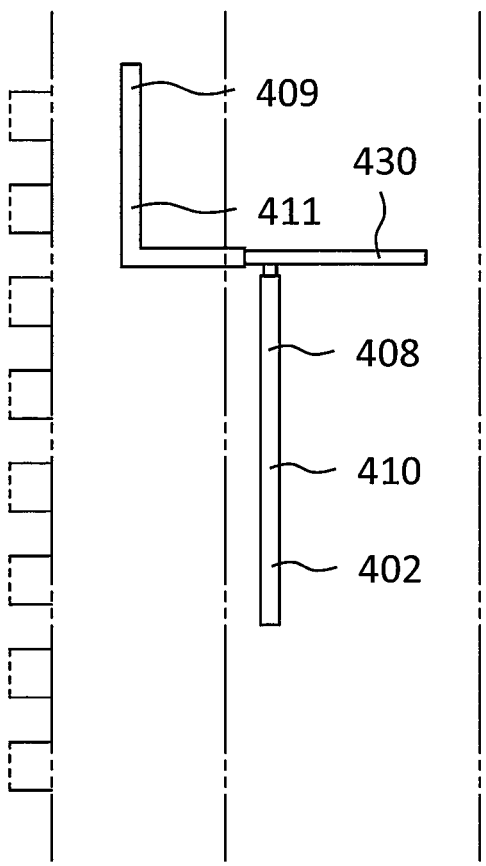
FIG. 12 is a plan view for illustrating a main part of a rotating electric machine of a comparative example.
Figure 13:
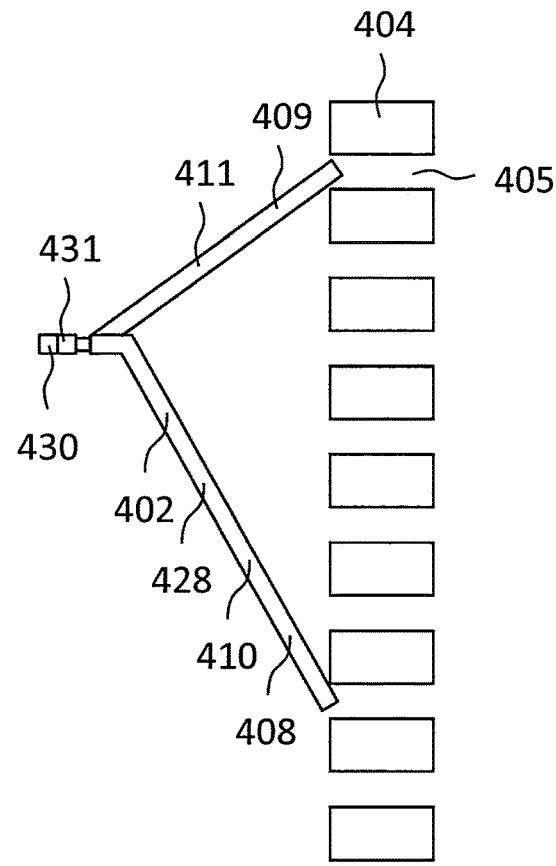
FIG. 13 is a side view for illustrating a main part of the rotating electric machine of FIG. 12.
Figure 14:
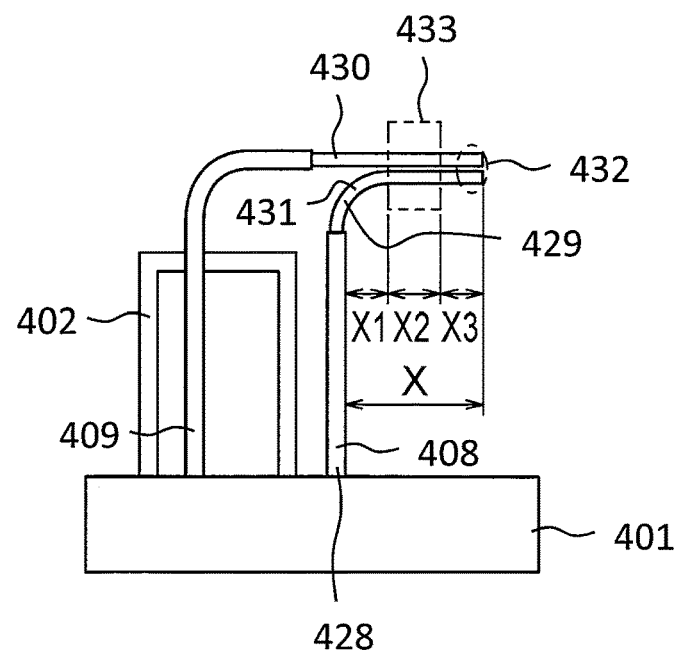
FIG. 14 is a side view for illustrating a main part of the rotating electric machine of FIG. 12.

FIG. 12 is a plan view for illustrating a main part of a rotating electric machine of a comparative example. FIG. 13 is a side view for illustrating a main part of the rotating electric machine of FIG. 12. FIG. 14 is a side view for illustrating a main part of the rotating electric machine of FIG. 12. In FIG. 12, illustration is given of the main part of the rotating electric machine as seen in the axial direction. In FIG. 13, illustration is given of the main part of the rotating electric machine as seen in the radial direction. In FIG. 14, illustration is given of the main part of the rotating electric machine as seen in the circumferential direction.

In the rotating electric machine of the comparative example, the outer-peripheral-side terminal 408 of the first coil 410 and the inner-peripheral-side terminal 409 of the second coil 411 are joined to each other. A portion of the outer-peripheral-side terminal 408 projecting from the slot portion 406 toward one side along the axial direction is referred to as "outer-peripheral-side-terminal straight portion 428."

The outer-peripheral-side terminal 408 includes a conductor-exposed portion 429. The conductor-exposed portion 429 is arranged at a distal end portion of the outer-peripheral-side terminal 408 compared to the outer-peripheral-side-terminal straight portion 428. The inner-peripheral-side terminal 409 includes a conductor-exposed portion 430. The conductor-exposed portion 430 is opposed to the conductor-exposed portion 429. The conductor-exposed portion 429 and the conductor-exposed portion 430 are placed on each other in the axial direction.

A portion at which the conductor-exposed portion 429 and the conductor-exposed portion 430 are opposed to each other in the axial direction is referred to as "opposing portion." The opposing portion of the conductor-exposed portion 429 and the conductor-exposed portion 430 extends in the radial direction. A position in the radial direction at a portion on an inner side of the opposing portion of the conductor-exposed portion 429 and the conductor-exposed portion 430 in the radial direction is referred to as "opposing start position." The opposing start position of the conductor-exposed portion 429 and the conductor-exposed portion 430 is a position on an outer side in the radial direction compared to a position of the outer-peripheral-side-terminal straight portion 428. In other words, the entirety of the opposing portion of the conductor-exposed portion 429 and the conductor-exposed portion 430 is arranged on an outer side in the radial direction compared to the outer-peripheral-side-terminal straight portion 428.

The conductor-exposed portion 429 of the outer-peripheral-side terminal 408 includes a radially bent portion 431 which is bent so that a distal end portion thereof is directed toward an outer side in the radial direction. A dimension of the radially bent portion 431 in the radial direction is represented by X1.

The distal end portions of the conductor-exposed portion 429 and the conductor-exposed portion 430 at the opposing portion are joined to each other. The portion at which the conductor-exposed portion 429 and the conductor-exposed portion 430 are joined to each other is referred to as "joint portion 432." A welding chuck space 433 is given around a portion of the conductor-exposed portion 429 between the radially bent portion 431 and the joint portion 432. The welding chuck space 433 is a space required for joining the conductor-exposed portion 429 and the conductor-exposed portion 430 to each other. A dimension of the welding chuck space 433 in the radial direction is represented by X2.

A dimension of the joint portion 432 in the radial direction is represented by X3. A dimension of the conductor-exposed portion 429 projecting from the outer-peripheral-side-terminal straight portion 428 toward an outer side in the radial direction is represented by X. The dimension X is a dimension corresponding to a sum total of the dimension X1, the dimension X2, and the dimension X3. Thus, in the rotating electric machine of the comparative example, the dimension of the coil 402 in the radial direction becomes larger. As a result, the rotating electric machine is increased in size in the radial direction.

Figure 15:
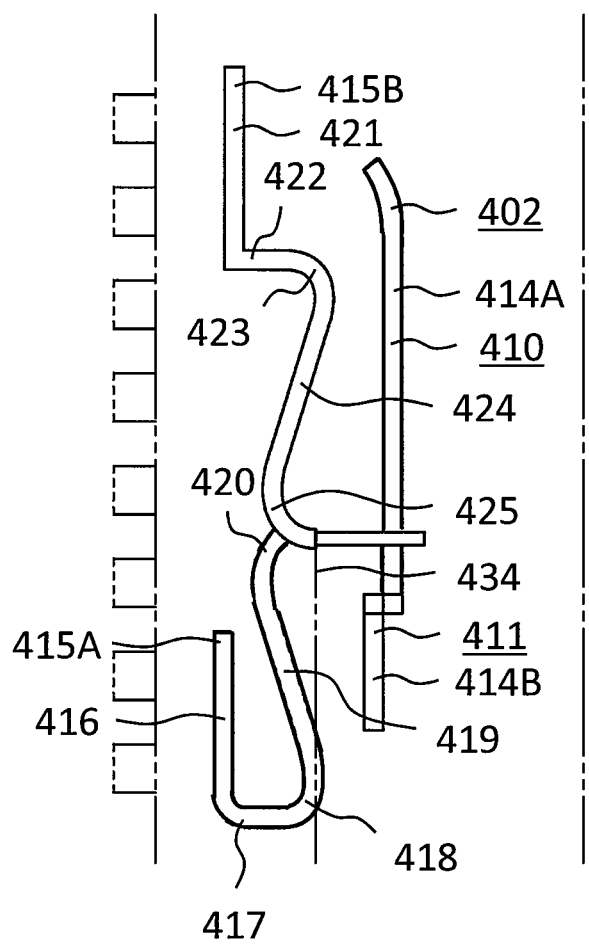
FIG. 15 is a plan view for illustrating a main part of the rotating electric machine of FIG. 1.
Figure 16:
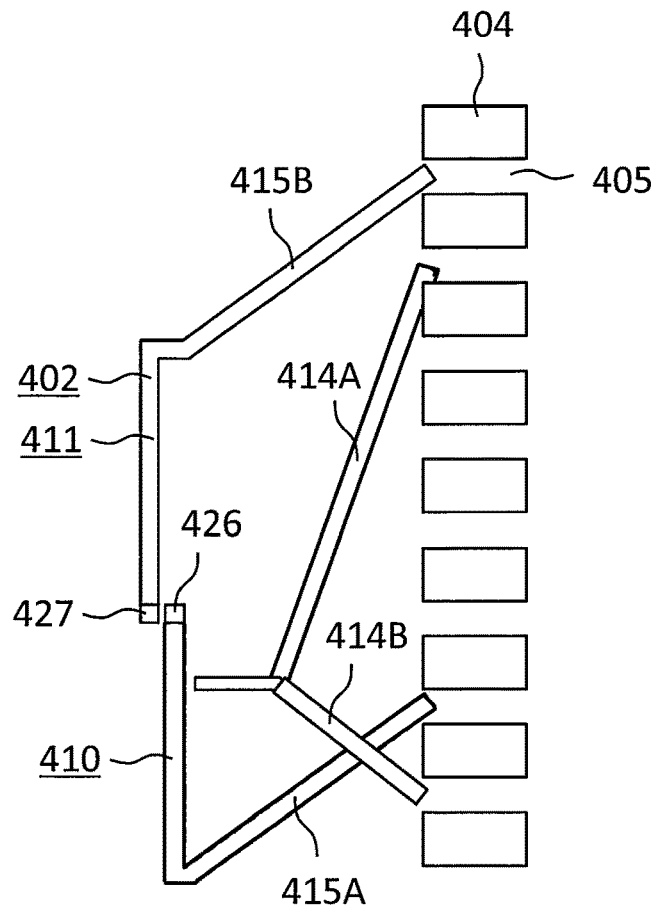
FIG. 16 is a side view for illustrating a main part of the rotating electric machine of FIG. 15.
Figure 17:
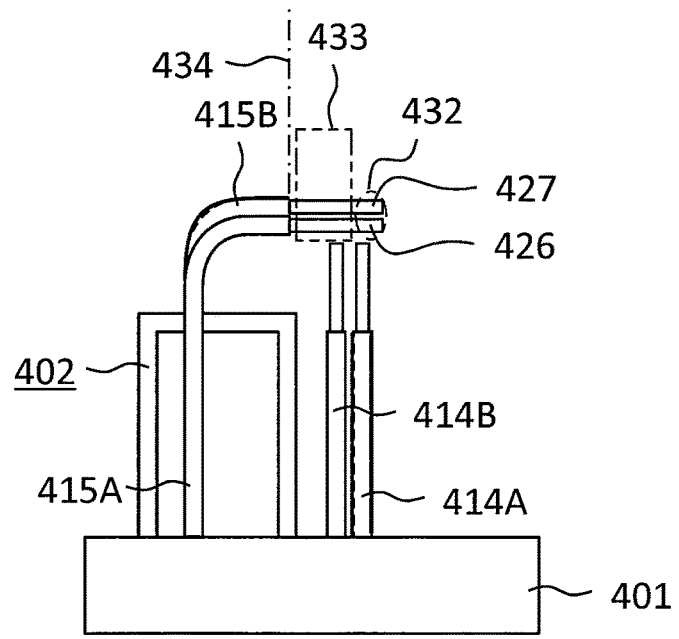
FIG. 17 is a side view for illustrating a main part of the rotating electric machine of FIG. 15.

FIG. 15 is a plan view for illustrating a main part of the rotating electric machine 1 of FIG. 1. FIG. 16 is a side view for illustrating a main part of the rotating electric machine 1 of FIG. 15. FIG. 17 is a side view for illustrating a main part of the rotating electric machine 1 of FIG. 15. In FIG. 15, illustration is given of the main part of the rotating electric machine as seen in the axial direction. In FIG. 16, illustration is given of the main part of the rotating electric machine as seen in the radial direction. In FIG. 17, illustration is given of the main part of the rotating electric machine as seen in the circumferential direction.

In the rotating electric machine of the first embodiment, the first outer-peripheral-side terminal 414A and the second outer-peripheral-side terminal 414B are joined to each other, and the first inner-peripheral-side terminal 415A and the second inner-peripheral-side terminal 415B are joined to each other.

A portion at which the first conductor-exposed portion 426 and the second conductor-exposed portion 427 are opposed to each other in the axial direction is referred to as "opposing portion." The opposing portion of the first conductor-exposed portion 426 and the second conductor-exposed portion 427 extends in the radial direction. A position in the radial direction at a portion on an inner side of the opposing portion of the first conductor-exposed portion 426 and the second conductor-exposed portion 427 in the radial direction is referred to as "opposing start position 434." The opposing start position 434 is arranged on an inner side in the radial direction compared to the first outer-peripheral-side terminal 414A and the second outer-peripheral-side terminal 414B. In other words, at least a part of the opposing portion of the first conductor-exposed portion 426 and the second conductor-exposed portion 427 is arranged on an inner side in the radial direction compared to the first outer-peripheral-side terminal 414A and the second outer-peripheral-side terminal 414B.

The first slot portion 412A arranged on the outermost side in the radial direction among the plurality of first slot portions 412A inserted into one slot 405 is referred to as "first outermost slot portion." The second slot portion 412B arranged on the outermost side in the radial direction among the plurality of second slot portions 412B inserted into one slot 405 is referred to as "second outermost slot portion." A base end portion of the first outer-peripheral-side terminal 414A is connected to the first outermost slot portion. A base end portion of the second outer-peripheral-side terminal 414B is connected to the second outermost slot portion. The first outer-peripheral-side terminal 414A and the second outer-peripheral-side terminal 414B each extend in the axial direction.

As described above, in the rotating electric machine 1 according to the first embodiment, at least a part of the opposing portion of the first conductor-exposed portion 426 and the second conductor-exposed portion 427 is arranged on the inner side in the radial direction compared to the first outer-peripheral-side terminal 414A and the second outer-peripheral-side terminal 414B. With this, a dimension of the coil 402 in the axial direction can be set smaller, and a dimension of the coil 402 in the radial direction can be set smaller. As a result, the rotating electric machine 1 can be downsized in the axial direction and in the radial direction.

Moreover, in the rotating electric machine 1 according to the first embodiment, the cross point CP is arranged on the outer side in the radial direction compared to the first radially bent portion 417 and the second radially bent portion 422. With this, as compared to the case in which the cross point CP is arranged on the inner side in the radial direction compared to the first radially bent portion 417 and the second radially bent portion 422, a space on the inner side of a coil end of the coil 402 in the radial direction can be set larger.

Moreover, in the rotating electric machine 1 according to the first embodiment, the first inner-peripheral-side terminal 415A includes the first inner bent portion 418, the first oblique portion 419, and the first outer bent portion 420, and the second inner-peripheral-side terminal 415B includes the second inner bent portion 423, the second oblique portion 424, and the second outer bent portion 425. With this, at least a part of the opposing portion of the first conductor-exposed portion 426 and the second conductor-exposed portion 427 can easily be arranged on the inner side in the radial direction compared to the first outer-peripheral-side terminal 414A and the second outer-peripheral-side terminal 414B.

Moreover, in the rotating electric machine 1 according to the first embodiment, a position of the first radially bent portion 417 in the axial direction and a position of the second radially bent portion 422 in the axial direction are different from each other. With this, the cross point CP can easily be formed.

Moreover, in the rotating electric machine 1 according to the first embodiment, for each of the plurality of first coils 410 and the plurality of second coils 411, a position of the first radially bent portion 417 in the axial direction and a position of the second radially bent portion 422 in the axial direction are different from each other. With this, regularity can be given to a position of the joint portion 432 of the first conductor-exposed portion 426 and the second conductor-exposed portion 427. As a result, productivity of the rotating electric machine can be improved.

Moreover, in the rotating electric machine 1 according to the first embodiment, the base portion of the first outer-peripheral-side terminal 414A is connected to the first outermost slot portion, and the base end portion of the second outer-peripheral-side terminal 414B is connected to the second outermost slot portion. The first outer-peripheral-side terminal 414A and the second outer-peripheral-side terminal 414B are each arranged so as to extend in the axial direction. With this, the dimension of the coil 402 in the radial direction can be set smaller.

Second Embodiment

Figure 18:
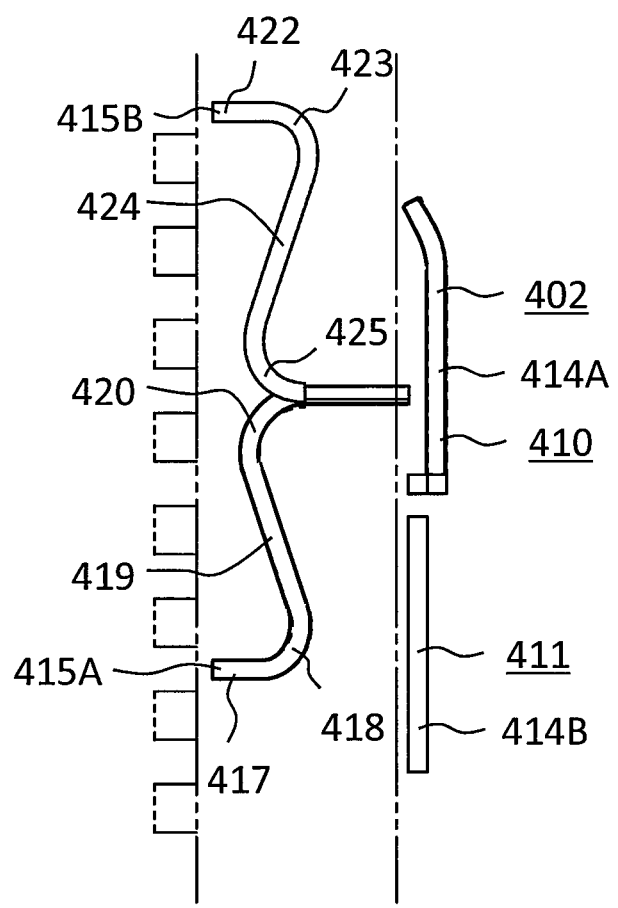
FIG. 18 is a plan view for illustrating a main part of a rotating electric machine according to a second embodiment of the present disclosure.
Figure 19:
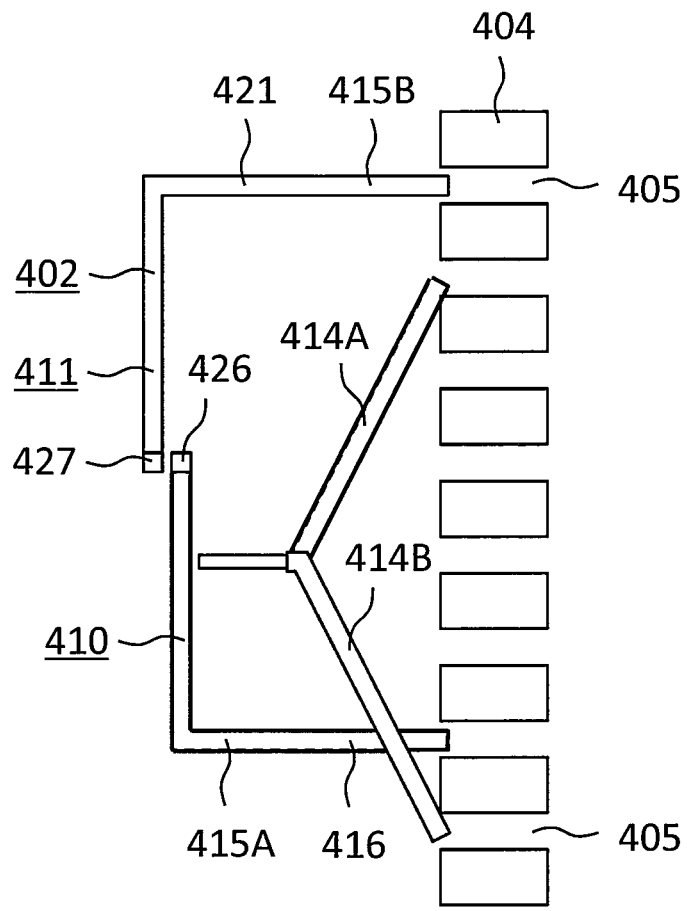
FIG. 19 is a side view for illustrating a main part of the rotating electric machine of FIG. 18.
Figure 20:
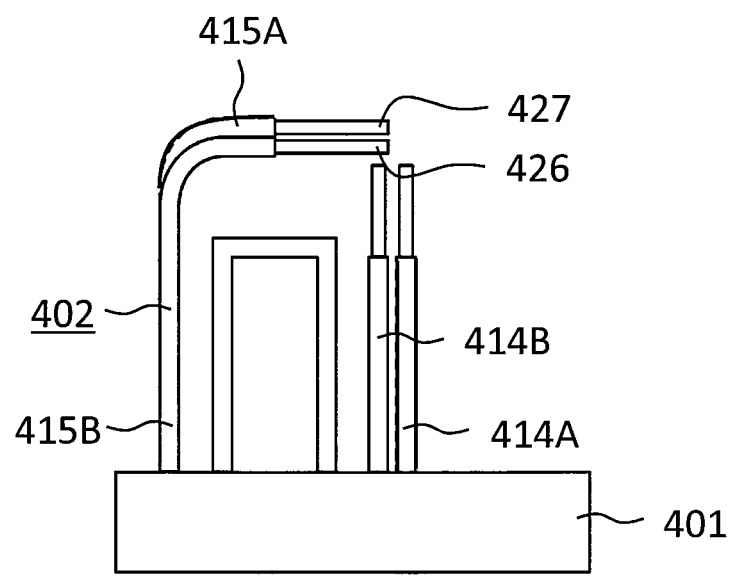
FIG. 20 is a side view for illustrating a main part of the rotating electric machine of FIG. 18.

FIG. 18 is a plan view for illustrating a main part of a rotating electric machine according to a second embodiment of the present disclosure. FIG. 19 is a side view for illustrating a main part of the rotating electric machine of FIG. 18. FIG. 20 is a side view for illustrating a main part of the rotating electric machine of FIG. 18. In FIG. 18, illustration is given of the main part of the rotating electric machine as seen in the axial direction. In FIG. 19, illustration is given of the main part of the rotating electric machine as seen in the radial direction. In FIG. 20, illustration is given of the main part of the rotating electric machine as seen in the circumferential direction.

The first coil 410 includes a plurality of first slot portions 412A inserted into one slot 405, and the second coil 411 includes a plurality of second slot portions 412B inserted into one slot 405. The first slot portion 412A arranged on the innermost side in the radial direction among the plurality of first slot portions 412A inserted into one slot 405 is referred to as "first innermost slot portion." The second slot portion 412B arranged on the innermost side in the radial direction among the plurality of second slot portions 412B inserted into one slot 405 is referred to as "second innermost slot portion."

In the rotating electric machine according to the second embodiment, the base end portion of the first inner-peripheral-side terminal 415A is connected to the first innermost slot portion. In other words, the first inner-peripheral-side terminal 415A projects from the most inner peripheral side region of the slot 405 toward one side in the axial direction.

The base end portion of the second inner-peripheral-side terminal 415B is connected to the second innermost slot portion. In other words, the second inner-peripheral-side terminal 415B projects from the most inner peripheral side region of the slot 405 toward one side in the axial direction.

The first base portion 416 extends straight from the slot 405 in the axial direction. The second base portion 421 extends straight from the slot 405 in the axial direction. Other configurations are the same as those of the first embodiment.

Figure 21:
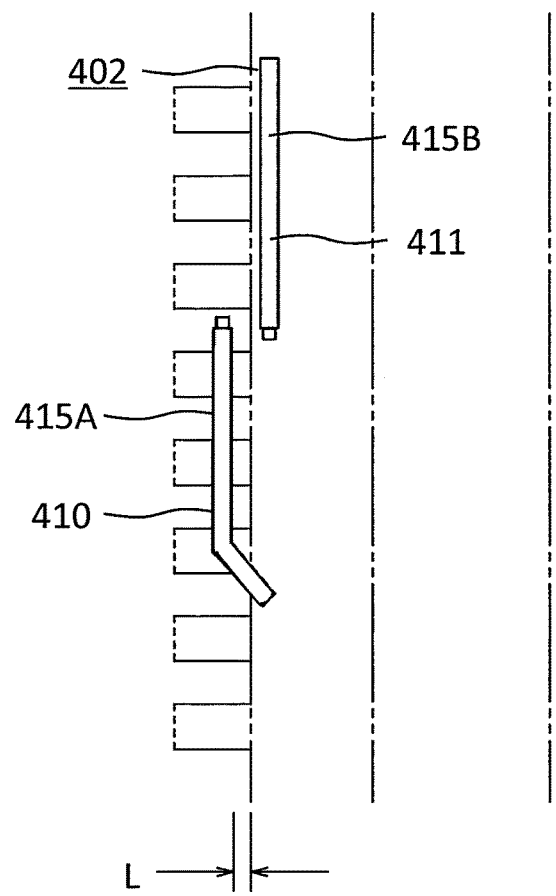
FIG. 21 is a plan view for illustrating a main part of a rotating electric machine of a comparative example.
Figure 22:
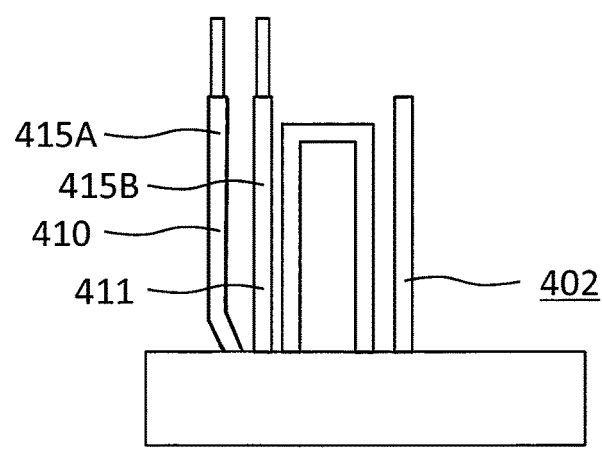
FIG. 22 is a side view for illustrating a main part of the rotating electric machine of FIG. 21.

FIG. 21 is a plan view for illustrating a main part of a rotating electric machine of a comparative example. FIG. 22 is a side view for illustrating a main part of the rotating electric machine of FIG. 21. In FIG. 21, illustration is given of the main part of the rotating electric machine as seen in the axial direction. In FIG. 22, illustration is given of the main part of the rotating electric machine as seen in the circumferential direction. In the rotating electric machine of the comparative example, the first inner-peripheral-side terminal 415A of the first coil 410 and the second inner-peripheral-side terminal 415B of the second coil 411 are joined to each other.

The first inner-peripheral-side terminal 415A is bent toward the inner side in the radial direction by a dimension L corresponding to a dimension of one lead wire forming the coil 402 with respect to a first inner-peripheral-side terminal 415A of another phase (not shown) adjacent to the first inner-peripheral-side terminal 415A in the circumferential direction. With this, as compared to the rotating electric machine according to the second embodiment, a part of the coil 402 projects toward the inner side in the radial direction. As a result, when the rotor 5 is to be inserted into the inside of the stator 4, an insertion direction is limited.

Meanwhile, in the rotating electric machine according to the second embodiment, as compared to the rotating electric machine of the comparative example, a part of the coil 402 on the inner side in the radial direction extends straight in the axial direction. With this, when the rotor 5 is to be inserted into the inside of the stator 4, the insertion direction is not limited.

As described above, in the rotating electric machine 1 according to the second embodiment, the base end portion of the first inner-peripheral-side terminal 415A is connected to the first innermost slot portion, and the base end portion of the second inner-peripheral-side terminal 415B is connected to the second innermost slot portion. With this, the first base portion 416 and the second base portion 421 can extend straight from the slot 405 in the axial direction. As a result, the lengths of the first inner-peripheral-side terminal 415A and the second inner-peripheral-side terminal 415B can be set smaller.

Moreover, in the rotating electric machine 1 according to the second embodiment, the first base portion 416 and the second base portion 421 extend straight from the slot 405 in the axial direction. With this, the limitation on the insertion direction given at the time of inserting the rotor 5 into the inside of the stator 4 is eliminated. Moreover, a region of the slot 405 occupied by the slot portions 406 can be set larger. With this, a sectional area of the coil 402 can be set larger. Thus, copper loss that occurs in the coil 402 can be reduced, thereby being capable of achieving high efficiency of the rotating electric machine 1. Moreover, the coil end does not project toward the inner side in the radial direction, thereby being capable of reducing an eddy current generated by a leakage magnetic flux flowing through the coil end. As a result, higher efficiency of the rotating electric machine 1 can be achieved.

Third Embodiment

Figure 23:
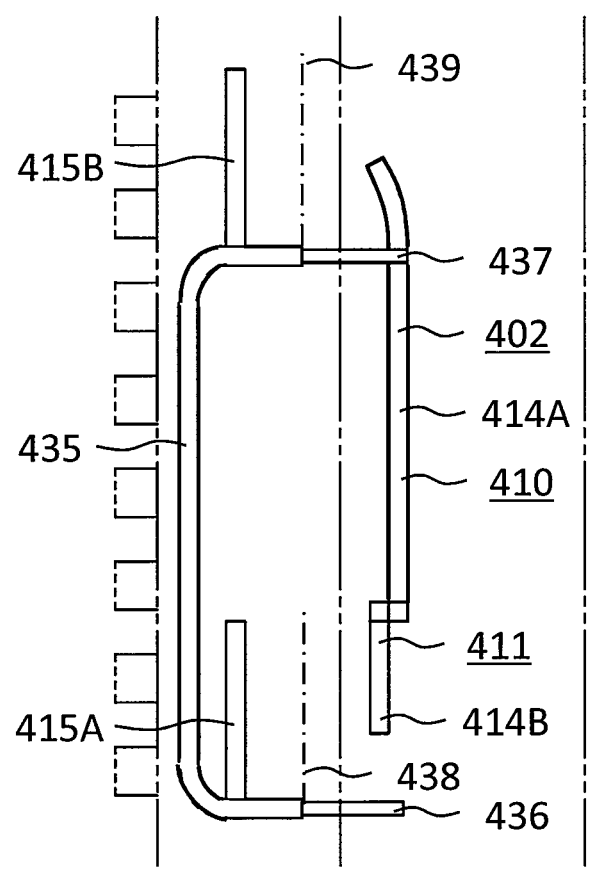
FIG. 23 is a plan view for illustrating a main part of a rotating electric machine according to a third embodiment of the present disclosure.
Figure 24:
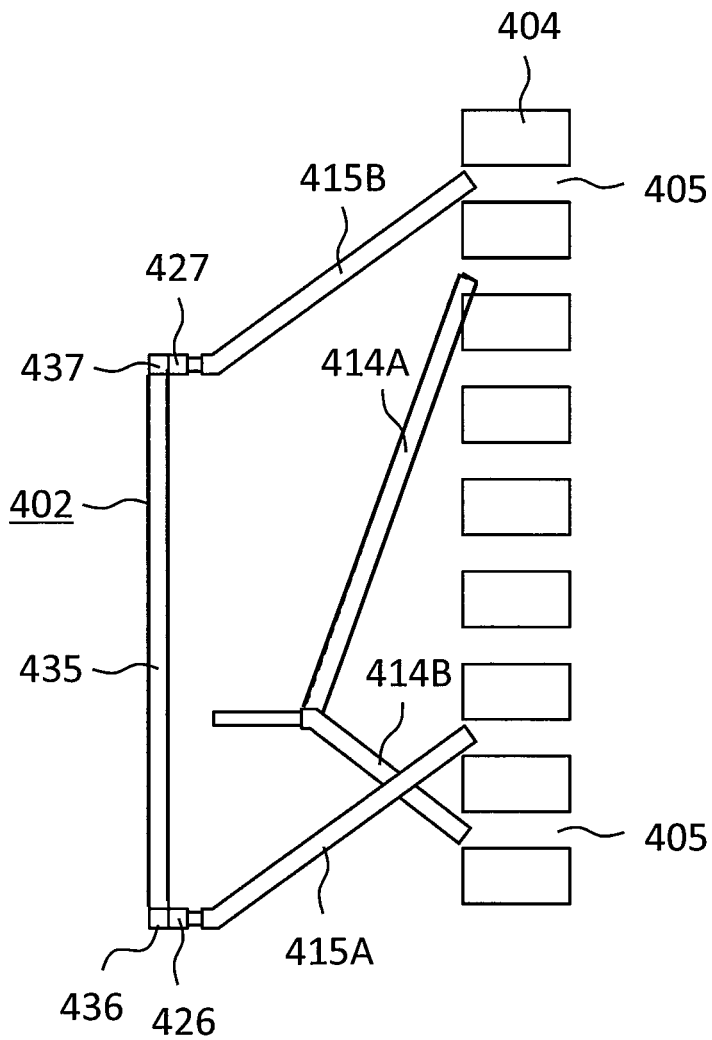
FIG. 24 is a side view for illustrating a main part of the rotating electric machine of FIG. 23.
Figure 25:
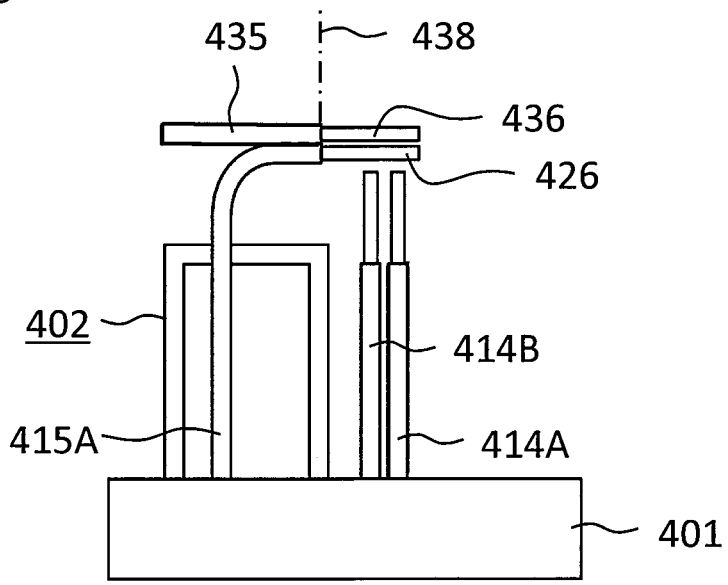
FIG. 25 is a side view for illustrating a main part of the rotating electric machine of FIG. 23.

FIG. 23 is a plan view for illustrating a main part of a rotating electric machine according to a third embodiment of the present disclosure. FIG. 24 is a side view for illustrating a main part of the rotating electric machine of FIG. 23. FIG. 25 is a side view for illustrating a main part of the rotating electric machine of FIG. 23. In FIG. 23, illustration is given of the main part of the rotating electric machine as seen in the axial direction. In FIG. 24, illustration is given of the main part of the rotating electric machine as seen in the radial direction. In FIG. 25, illustration is given of the main part of the rotating electric machine as seen in the circumferential direction.

In the rotating electric machine 1 according to the third embodiment, the coil 402 includes an additional wire 435 provided over the first coil 410 and the second coil 411. The additional wire 435 is formed into a U-shape as seen in the axial direction.

Between the first coil 410 and the second coil 411, the first inner-peripheral-side terminal 415A and one end portion of the additional wire 435 are joined to each other, and the second inner-peripheral-side terminal 415B and another end portion of the additional wire 435 are joined to each other.

The additional wire 435 includes a first additional-wire conductor-exposed portion 436 and a second additional-wire conductor-exposed portion 437. The first additional-wire conductor-exposed portion 436 is opposed to the first conductor-exposed portion 426 in the axial direction. The second additional-wire conductor-exposed portion 437 is opposed to the second conductor-exposed portion 427 in the axial direction. The first conductor-exposed portion 426 is joined to the first additional-wire conductor-exposed portion 436. The second conductor-exposed portion 427 is joined to the second additional-wire conductor-exposed portion 437.

A portion at which the first conductor-exposed portion 426 and the first additional-wire conductor-exposed portion 436 are opposed to each other in the axial direction is referred to as "first opposing portion." The first opposing portion of the first conductor-exposed portion 426 and the first additional-wire conductor-exposed portion 436 extends in the radial direction. A portion at which the second conductor-exposed portion 427 and the second additional-wire conductor-exposed portion 437 are opposed to each other in the axial direction is referred to as "second opposing portion." The second opposing portion of the second conductor-exposed portion 427 and the second additional-wire conductor-exposed portion 437 extends in the radial direction.

A position in the radial direction at a portion on an inner side of the first opposing portion of the first conductor-exposed portion 426 and the first additional-wire conductor-exposed portion 436 in the radial direction is referred to as "first opposing start position 438." The first opposing start position 438 is arranged on an inner side in the radial direction compared to the first outer-peripheral-side terminal 414A and the second outer-peripheral-side terminal 414B. In other words, at least a part of the first opposing portion of the first conductor-exposed portion 426 and the first additional-wire conductor-exposed portion 436 is arranged on the inner side in the radial direction compared to the first outer-peripheral-side terminal 414A and the second outer-peripheral-side terminal 414B.

A position in the radial direction at a portion on an inner side of the second opposing portion of the second conductor-exposed portion 427 and the second additional-wire conductor-exposed portion 437 in the radial direction is referred to as "second opposing start position 439." The second opposing start position 439 is arranged on an inner side in the radial direction compared to the first outer-peripheral-side terminal 414A and the second outer-peripheral-side terminal 414B. In other words, at least a part of the second opposing portion of the second conductor-exposed portion 427 and the second additional-wire conductor-exposed portion 437 is arranged on the inner side in the radial direction compared to the first outer-peripheral-side terminal 414A and the second outer-peripheral-side terminal 414B.

The first opposing start position 438 and the second opposing start position 439 are positions adjacent to each other in the circumferential direction. Other configurations are the same as those of the first embodiment. Other configurations may be the same as those of the second embodiment.

As described above, in the rotating electric machine 1 according to the third embodiment, at least a part of the first opposing portion of the first conductor-exposed portion 426 and the first additional-wire conductor-exposed portion 436 is arranged on the inner side in the radial direction compared to the first outer-peripheral-side terminal 414A and the second outer-peripheral-side terminal 414B. Moreover, at least a part of the second opposing portion of the second conductor-exposed portion 427 and the second additional-wire conductor-exposed portion 437 is arranged on the inner side in the radial direction compared to the first outer-peripheral-side terminal 414A and the second outer-peripheral-side terminal 414B. With this, a dimension of the coil 402 in the axial direction can be set smaller, and a dimension of the coil 402 in the radial direction can be set smaller. As a result, the rotating electric machine 1 can be downsized in the axial direction and in the radial direction.

Moreover, in the rotating electric machine 1 according to the third embodiment, the first inner-peripheral-side terminal 415A and the second inner-peripheral-side terminal 415B are connected to each other through intermediation of the additional wire 435. With this, the lengths of the first inner-peripheral-side terminal 415A and the second inner-peripheral-side terminal 415B can be set smaller. Thus, the plurality of coils 402 can easily be assembled. As a result, productivity of the rotating electric machine can be improved.

Moreover, in the rotating electric machine 1 according to the third embodiment, the first inner-peripheral-side terminal 415A and the second inner-peripheral-side terminal 415B are connected to each other through intermediation of the additional wire 435. With this, the lengths of the first inner-peripheral-side terminal 415A and the second inner-peripheral-side terminal 415B can be set equal to each other. As a result, kinds of the coils 402 can be reduced. As a result, productivity of the rotating electric machine can be improved.

Fourth Embodiment

Figure 26:
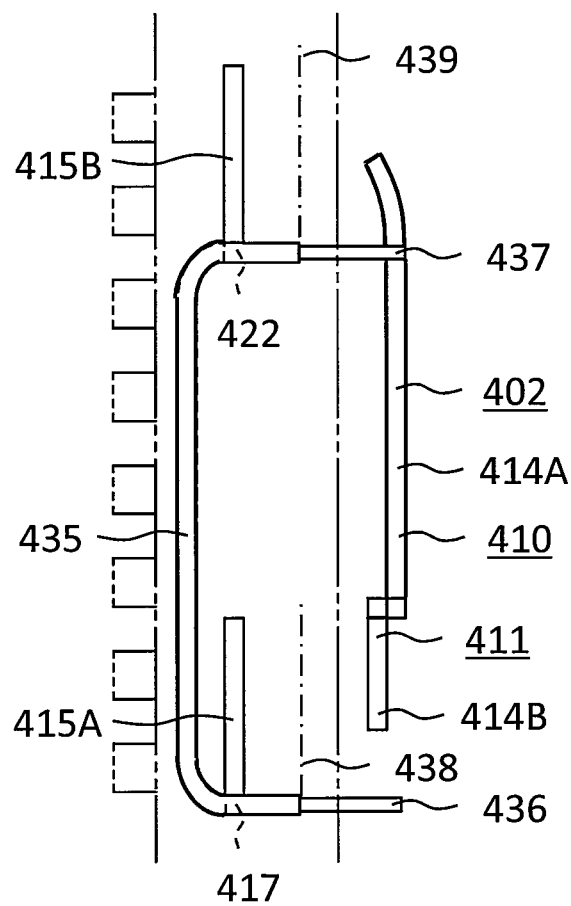
FIG. 26 is a plan view for illustrating a main part of a rotating electric machine according to a fourth embodiment of the present disclosure.
Figure 27:
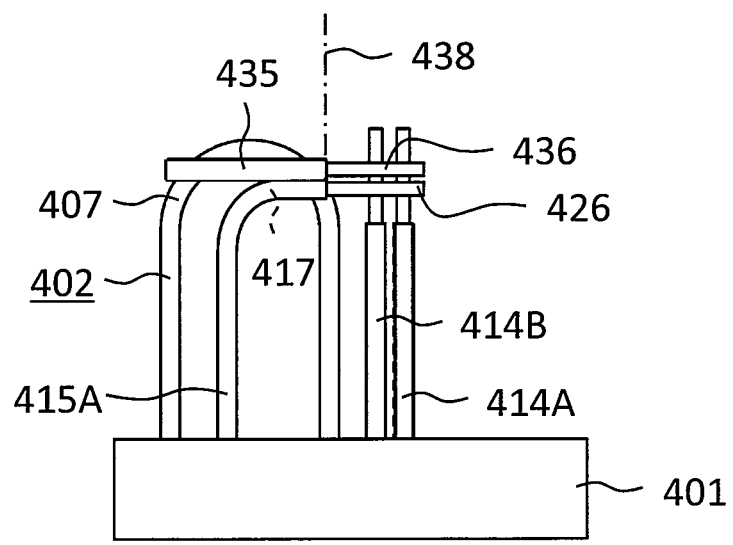
FIG. 27 is a side view for illustrating a main part of the rotating electric machine of FIG. 26.

FIG. 26 is a plan view for illustrating a main part of a rotating electric machine according to a fourth embodiment of the present disclosure. FIG. 27 is a side view for illustrating a main part of the rotating electric machine of FIG. 26. In FIG. 26, illustration is given of the main part of the rotating electric machine as seen in the axial direction. In FIG. 27, illustration is given of the main part of the rotating electric machine as seen in the circumferential direction.

The first radially bent portion 417 and the second radially bent portion 422 are arranged closer to the stator core 401 in the axial direction compared to top portions of the turn portions 407 being coil-end top portions. The additional wire 435 is arranged closer to the stator core 401 in the axial direction compared to the top portions of the turn portions 407. Other configurations are the same as those of the third embodiment.

As described above, in the rotating electric machine 1 according to the fourth embodiment, the first radially bent portion 417 and the second radially bent portion 422 are arranged closer to the stator core 401 compared to the top portions of the turn portions 407 in the axial direction. With this, the dimension of the coil end in the axial direction can be set smaller. As a result, the dimension of the stator 4 in the axial direction can be set smaller.

Further, in the rotating electric machine 1 according to the fourth embodiment, the additional wire 435 is arranged closer to the stator core 401 compared to the top portions of the turn portions 407 in the axial direction. With this, the dimension of the coil end in the axial direction can be set smaller. As a result, the dimension of the stator 4 in the axial direction can be set smaller.

What is claimed is:

1. A rotating electric machine, comprising:
   an armature core having a plurality of slots arranged in a circumferential direction; and
   a plurality of coils of distributed winding provided to the armature core,
   wherein the plurality of the coils include:
      a plurality of first coils each including:
         a first outer-peripheral-side terminal projecting in an axial direction from an outside region of the slot in a radial direction; and
         a first inner-peripheral-side terminal projecting in the axial direction from an inside region of the slot in the radial direction, which is spaced apart on one side in the circumferential direction with respect to the slot from which the first outer-peripheral-side terminal projects; and
      a plurality of second coils each including:
         a second outer-peripheral-side terminal projecting in the axial direction from an outside region of the slot in the radial direction; and
         a second inner-peripheral-side terminal projecting in the axial direction from an inside region of the slot in the radial direction, which is spaced apart on one side in the circumferential direction with respect to the slot from which the second outer-peripheral-side terminal projects,
   wherein the plurality of first coils and the plurality of second coils are alternately arranged in the circumferential direction so that the first outer-peripheral-side terminal and the second inner-peripheral-side terminal project from the same slot, and that the first inner-peripheral-side terminal and the second outer-peripheral-side terminal project from the same slot,
   wherein the first inner-peripheral-side terminal includes a first conductor-exposed portion,
   wherein the second inner-peripheral-side terminal includes a second conductor-exposed portion opposed to the first conductor-exposed portion,
   wherein an opposing portion, which is a portion at which the first conductor-exposed portion and the second conductor-exposed portion are opposed to each other, extends in the radial direction, and
   wherein at least a part of the opposing portion is arranged on an inner side in the radial direction compared to the first outer-peripheral-side terminal and the second outer-peripheral-side terminal.

2. The rotating electric machine according to claim 1, wherein the first inner-peripheral-side terminal includes:
   a first base portion projecting in the axial direction from the slot; and
   a first radially bent portion, which is connected to a distal end portion of the first base portion, and has a distal end portion bent so as to be directed toward an outer side in the radial direction,
wherein the second inner-peripheral-side terminal includes:
   a second base portion projecting in the axial direction from the slot; and
   a second radially bent portion, which is connected to a distal end portion of the second base portion, and has a distal end portion bent so as to be directed toward an outer side in the radial direction,
wherein a portion, at which the first inner-peripheral-side terminal of one coil of a pair of coils having different phases and the second inner-peripheral-side terminal of another coil overlap each other as seen in the axial direction, is defined as a cross point, and
wherein the cross point is arranged on an outer side in the radial direction with respect to the first radially bent portion and the second radially bent portion.

3. The rotating electric machine according to claim 2, wherein the first inner-peripheral-side terminal includes:
   a first inner bent portion, which is connected to a distal end portion of the first radially bent portion, and is bent along a perpendicular plane with respect to the axial direction so that a distal end portion thereof is arranged on an inner side in the radial direction compared to an intermediate portion;
   a first oblique portion, which is connected to a distal end portion of the first inner bent portion, and is arranged along a perpendicular plane with respect to the axial direction so that a distal end portion thereof is arranged on an inner side in the radial direction compared to a base end portion thereof; and
   a first outer bent portion, which is connected to a distal end portion of the first oblique portion, is bent along a perpendicular plane with respect to the axial direction so that a distal end portion thereof is directed toward an outer side in the radial direction, and has a base end portion of the first conductor-exposed portion connected to the distal end portion, wherein the second inner-peripheral-side terminal includes:

a second inner bent portion, which is connected to a distal end portion of the second radially bent portion, and is bent along a perpendicular plane with respect to the axial direction so that a distal end portion thereof is arranged on an inner side in the radial direction compared to an intermediate portion;

a second oblique portion, which is connected to a distal end portion of the second inner bent portion, and is arranged along a perpendicular plane with respect to the axial direction so that a distal end portion thereof is arranged on an inner side in the radial direction compared to a base end portion thereof; and a second outer bent portion, which is connected to a distal end portion of the second oblique portion, is bent along a perpendicular plane with respect to the axial direction so that a distal end portion thereof is directed toward an outer side in the radial direction, and has a base end portion of the second conductor-exposed portion connected to the distal end portion.

4. The rotating electric machine according to claim 2, wherein a position of the first radially bent portion in the axial direction and a position of the second radially bent portion in the axial direction are different from each other.

5. The rotating electric machine according to claim 4, wherein, for each of the plurality of first coils and the plurality of second coils, a position of the first radially bent portion in the axial direction and a position of the second radially bent portion in the axial direction are different from each other.

6. The rotating electric machine according to claim 2, wherein the first radially bent portion and the second radially bent portion each are arranged closer to the armature core compared to a coil-end top portion in the axial direction.

7. A rotating electric machine, comprising:

an armature core having a plurality of slots arranged in a circumferential direction; and a plurality of coils of distributed winding provided to the armature core, wherein the plurality of the coils include:

a plurality of first coils each including:

a first outer-peripheral-side terminal projecting in an axial direction from an outside region of the slot in a radial direction; and a first inner-peripheral-side terminal projecting in the axial direction from an inside region of the slot in the radial direction spaced apart on one side in the circumferential direction with respect to the slot from which the first outer-peripheral-side terminal projects;

a plurality of second coils each including:

a second outer-peripheral-side terminal projecting in the axial direction from an outside region of the slot in the radial direction; and a second inner-peripheral-side terminal projecting in the axial direction from an inside region of the slot in the radial direction spaced apart on one side in the circumferential direction with respect to the slot from which the second outer-peripheral-side terminal projects, and an additional wire provided over the first coil and the second coil, wherein the plurality of first coils and the plurality of second coils are alternately arranged in the circumferential direction so that the first outer-peripheral-side terminal and the second inner-peripheral-side terminal project from the same slot and that the first inner-peripheral-side terminal and the second outer-peripheral-side terminal project from the same slot, wherein the first inner-peripheral-side terminal includes a first conductor-exposed portion, wherein the second inner-peripheral-side terminal includes a second conductor-exposed portion, wherein the additional wire includes:

a first additional-wire conductor-exposed portion opposed to the first conductor-exposed portion; and a second additional-wire conductor-exposed portion opposed to the second conductor-exposed portion, wherein a first opposing portion being a portion, at which the first conductor-exposed portion and the first additional-wire conductor-exposed portion are opposed to each other, extends in the radial direction, wherein a second opposing portion being a portion, at which the second conductor-exposed portion and the second additional-wire conductor-exposed portion are opposed to each other, extends in the radial direction, and wherein at least a part of the first opposing portion and at least a part of the second opposing portion are arranged on an inner side in the radial direction compared to the first outer-peripheral-side terminal and the second outer-peripheral-side terminal.

8. The rotating electric machine according to claim 7, wherein the additional wire is arranged closer to the armature core compared to a coil-end top portion in the axial direction.

9. The rotating electric machine according to claim 1, wherein the plurality of first coils each include a plurality of first slot portions inserted into one slot, wherein the plurality of second coils each include a plurality of second slot portions inserted into one slot, wherein a base end portion of the first inner-peripheral-side terminal is connected to a first innermost slot portion being the first slot portion arranged on an innermost side in the radial direction among the plurality of first slot portions inserted into the one slot, and wherein a base end portion of the second inner-peripheral-side terminal is connected to a second innermost slot portion being the second slot portion arranged on an innermost side in the radial direction among the plurality of the second slot portions inserted into the one slot.

10. The rotating electric machine according to claim 1, wherein the plurality of first coils each include a plurality of first slot portions inserted into the one slot, wherein the plurality of second coils each include a plurality of second slot portions inserted into the one slot, wherein a base end portion of the first outer-peripheral-side terminal is connected to a first outermost slot portion being the first slot portion arranged on an outermost side in the radial direction among the plurality of first slot portions inserted into the one slot, wherein a base end portion of the second outer-peripheral-side terminal is connected to a second outermost slot portion being the second slot portion arranged on an outermost side in the radial direction among the plurality of second slot portions inserted into the one slot, and wherein the first outer-peripheral-side terminal and the second outer-peripheral-side terminal are each arranged so as to extend in the axial direction.

* * * * *